June 30, 1942. E. J. SIMBORG 2,288,425
DRIVE SPINDLE
Filed Feb. 15, 1941

Inventor:
Edward J. Simborg.
By Britton, Wiles, Davis, Hirschl & Dawson.
Attys.

Patented June 30, 1942

2,288,425

UNITED STATES PATENT OFFICE 2,288,425

DRIVE SPINDLE

Edward J. Simborg, Chicago, Ill., assignor to Inland Steel Company, Chicago, Ill., a corporation of Delaware Application February 15, 1941, Serial No. 379,129

2 Claims. (Cl. 64—28)

My invention relates to spindles provided for the transmitting of power from drive elements to elements to be driven; it having been devised for use more particularly, though not to its exclusion for other uses, in connection with levelers used for flattening metal sheets particularly of steel, wherein the spindles serve as the driving connections between the driving shafts and the rolls of the levelers.

It may be stated in this connection that such levelers as commonly provided comprise an upper and a lower series of parallel driven rolls spaced apart with the space narrowing toward the discharge end of the leveler and the rolls of one series being staggered relative to the rolls of the other series, the sheets to be leveled being passed between these series of rollers and traveling therethrough in a wavy path, and these several rollers being individually driven from a group of driven shafts of corresponding number commonly driven through gear mechanism from a single shaft.

In the use of the leveler a sheet sometimes becomes "cobbled" in the rolls exerting such tremendous resistance that one or more of the rolls stops rotating causing some point in the drive to fail and as the failure of the spindle between the drive shaft and the roll results in less damage than damage to the drive mechanism or the rolls it is desirable that the spindle be so constructed as to be the weakest point in the driving train, provided danger of the spindle becoming twisted, which may result in bending the driven shaft at the gear box, is avoided.

One of my objects is to provide a construction of drive spindle, as for example for a leveler as above mentioned, whereby should undue resistance to the rotation of the driven element, as for example the roll of a leveler under cobbling action, be developed, the spindle will break before damaging force is exerted on either the drive or driven element; to provide a spindle that will be of simple and economical construction, economical in use and formed of a small number of parts; to provide a spindle which may be quickly installed in place and quickly substituted for one which has become damaged; to provide a spindle of such construction that when provided in a multiple-tier group, as for example in the case of a leveler, each spindle may be removed and replaced and substitution made therefor without disturbing any of the other spindles; to provide a spindle by which the parts thereof resulting from breaking will be held together and prevented from damaging other spindles with which it may be grouped; to provide for the failure of the spindle by shearing, avoiding damage to parts other than that at which the shearing action takes place; to provide a construction whereby the shearing area may be located to suit conditions; to minimize noise in the operation of the spindle; to provide a construction in which the part to be replaced in case of breakage in use is comparatively inexpensive; and other objects as will be manifest from the following description.

Referring to the accompanying drawing.

Figure 1:
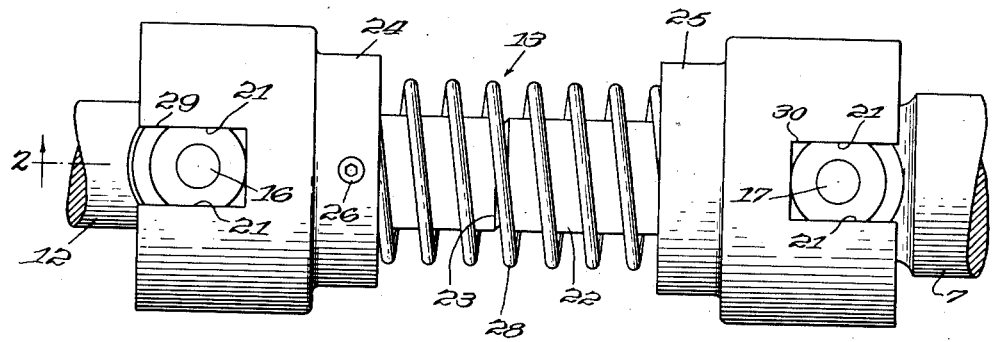
Figure 1 is an enlarged plan view of a drive spindle embodying my invention and portions of the drive shaft and the roll of a leveler which it connects.

In the arrangement shown, driving power is to be transmitted from one to the other of rotatable members 7 and 12, the member 7, by way of example, being one of the rolls of a leveler such as above referred to, and 12 a pinion shaft of drive mechanism for driving the rolls of the leveler, the shaft 12 being substantially axially alined with the roll 7.

Connecting the pinion-shaft 12 with the roll 7 to be driven thereby is a drive spindle 13 constructed in accordance with my invention.

The opposing end-portions of the pinion shaft 12 and the roll 7, represented at 14 and 15, respectively, are provided with pins 16 and 17 extending crosswise thereof and held to the ends of the shaft 12 and roll 7 by set screws 18, the ends of these pins carrying bushings 19 and 20 journaled on the pins and having flat sides 21.

The spindle comprises a bar 22 shown as square in cross section interposed between the opposing ends of the pinion shaft 12 and the roll 7 to be driven thereby, preferably with clearance between these parts as shown, the bar 22 having a weakened portion forming a shear section provided as for example by cutting a groove 23 in the bar as shown.

The spindle also comprises couplings 24 and 25, shown as sleeves, at opposite ends of the bar 22, the openings through these couplings being square to receive the bar and connect these parts together to form a drive unit. The coupling 24 is secured to the bar 22 to prevent relative lengthwise movement of these parts, as for example by means of a set screw 26 in the coupling, the inner end of the screw extending into a socket 27 in the bar 22. The other coupling 25 is free to slide along the bar.

Surrounding the bar 22 and interposed between the couplings 24 and 25 is a coil spring 28 which yieldingly forces the couplings away from each other.

The outer ends of the couplings 24 and 25, which are enlarged as shown, have diametrically disposed slots 29 and 30, respectively, for receiving the outer flat-sided ends of the bushings 19 as shown, these slots opening through the outer ends of the couplings.

The spindle may be assembled with the pinion shaft 12 and the roll 7 by first assembling the coupler 24 with the bar 22 to the position shown and the set screw 26 tightened to rigidly connect these parts together, and the spring 28 and then the coupling 25 slipped over the other end of the bar 22. The coupling 24 is then engaged at its slots 29 with the outer ends of the bushings 19 and the coupling 25 forced back, by the operator, against the resistance of the spring 28 to permit the coupling 25 to line up with the roll 7, the coupling 25 snapping into engagement at its slots 30 with the outer ends of the bushings 20 when the operator releases his grasp on the coupling 25, the spring thus operating to hold the couplings interconnected with the bushings.

Figure 2:
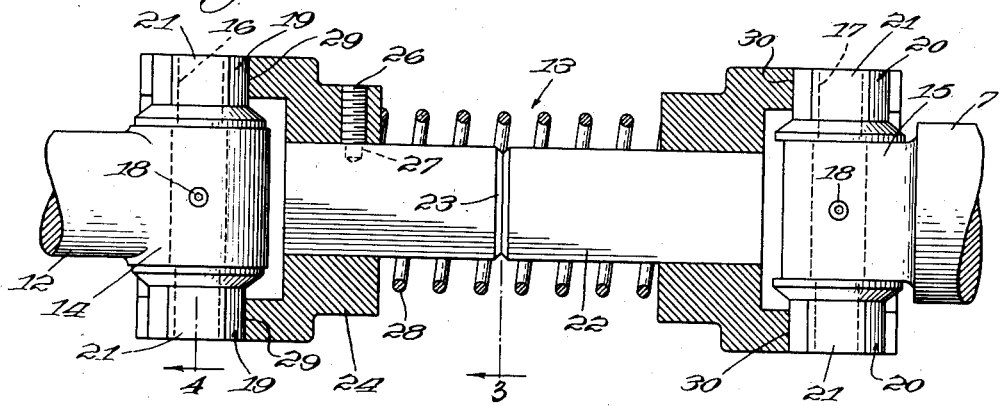
Figure 2 is a view in longitudinal section of the structure shown in Fig. 1, the section being taken at the line 2 on Fig. 1 and viewed in the direction of the arrow.
Figure 3:
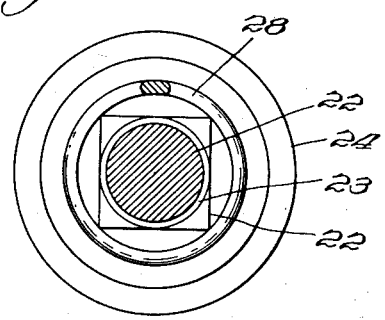
Figure 3 is a section taken at the line 3 on Fig. 2 and viewed in the direction of the arrow.
Figure 4:
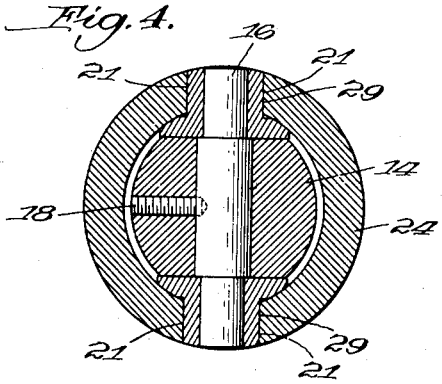
Figure 4, a section taken at the line 4 on Fig. 2 and viewed in the direction of the arrow.

The spring 28 in the case of the use of the spindle with a leveler is preferably a compression spring having a scale, by way of example, of 16 lbs. to 20 lbs. per inch and in the assembled position of the parts (Fig. 2) is preferably compressed from ¾" to 1".

It will be understood that the shear portion 23 should be sufficiently weak as to require less force to break the bar 22 at this point, than that required to damage any of the other parts of the apparatus.

A drive spindle embodying my invention may be quickly removed from operative position and quickly replaced when damaged, or another quickly substituted for it, whether the apparatus in connection with which it is used employs a single spindle or groups of spindles arranged in series, as for example in the case of a leveler, in which latter case any one of the spindles may be removed, replaced, or substitution made therefor, without disturbing any of the other spindles.

Furthermore, the spring 28, should the bar 22 break, will serve to hold the parts of the spindle together and prevent them from damaging other spindles and, by holding the coupling parts 24 and 25 firmly against the bushings with which they interlock, will eliminate noisy drive; the shear area may be varied to suit conditions; the positive shearing action resulting from excessive torsion on the spindle will eliminate the possibility of damage to the coupler elements carried by the bar; the bar being less expensive than the coupler parts carried thereby and the bar being the part usually required to be replaced, the cost of replacing spindle parts is reduced to the minimum; and the spindle is formed of a comparatively small number of parts.

While I have illustrated and described a particular construction embodying my invention, I do not wish to be understood as intending to limit it thereto as the same may be variously modified and altered and the invention embodied in other forms of structure without departing from the spirit of my invention.

What I claim as new and desire to secure by Letters Patent, is:

1. The combination with a drive element and an element to be driven thereby, said elements having transverse projections, of a spindle for driving said driven element from said drive element comprising a bar interposed between said elements, sleeves on, and having driving connection with, said bar, said sleeves having slots receiving said projections by lengthwise movement of said sleeves, to establish driving connection between said sleeves and said elements, means holding one of said sleeves against lengthwise movement on said bar, the other of said sleeves being slidable along said bar, and a coil spring interposed, in compression, between said sleeves, said bar having a portion between the ends of said spring at which said spindle fails when subjected to undue torque.

2. The combination with a drive element and an element to be driven thereby, of a spindle for driving said driven element from said drive element comprising members each having driving connection with one of said elements, a bar having driving association with said members, and slidable association with at least one thereof, a spring surrounding said bar and reacting between said members to separate them, a localized relatively weak portion formed in said bar in the part thereof surrounded by said spring and means to prevent substantial axial separation of the parts of said bar when broken.

EDWARD J. SIMBORG.